R. D. FINNIGAN.
PNEUMATIC STACKER HOOD.
APPLICATION FILED MAR. 22, 1912.
1,046,284.
Patented Dec. 3, 1912.
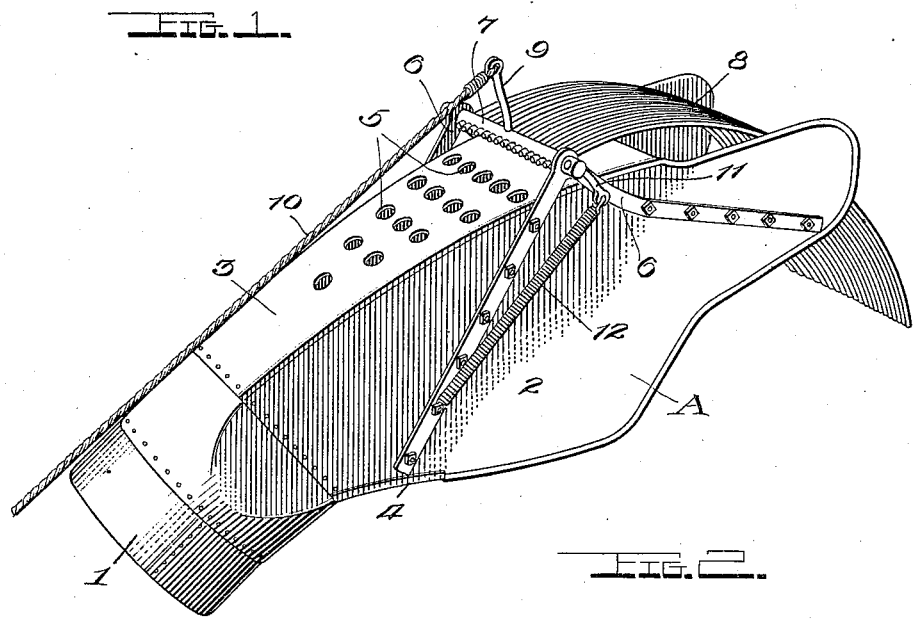
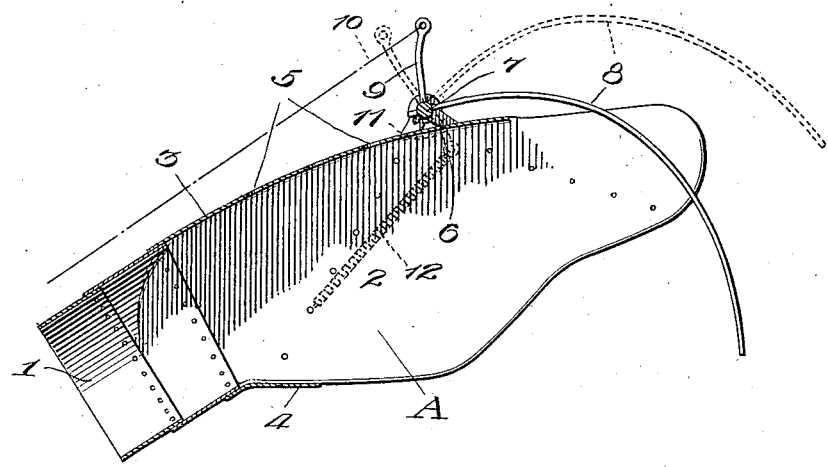

UNITED STATES PATENT OFFICE.

RENNIE DEAN FINNIGAN, OF VIOLA, IOWA.

PNEUMATIC-STACKER HOOD.

1,046,284.  Specification of Letters Patent.  Patented Dec. 3, 1912.

Application filed March 22, 1912. Serial No. 685,471.

*To all whom it may concern:*

Be it known that I, RENNIE DEAN FINNIGAN, a citizen of the United States, residing at Viola, in the county of Jones and State of Iowa, have invented certain new and useful Improvements in Pneumatic-Stacker Hoods, of which the following is a specification.

My invention relates to an improvement in pneumatic stacker hoods, and the object is to provide means whereby the straw or hay can be delivered from the hood at different angles and in a forward direction or practically straight from the hood. I have provided means which is capable of being thrown to various positions for controlling the discharge of the straw or hay from the hood preferably in a downward direction in stacking the straw; but where it is desired to discharge the straw or hay into a barn or building, this means is thrown to a position so that it will not interfere with the direct discharge of the straw from the hood. Said means extends over the forward opening and causes the straw to take a downward path.

A further object is in the provision of means for discharging the air from the hood, whereby the straw will be allowed to fall of its own weight upon the stack and thereby prevent the straw from being blown promiscuously, and at the same time prevent the air blast from blowing off the top of the stack.

The invention consists in certain other novel features of construction and combinations of parts which will be hereinafter fully described and pointed out in the claims.

In the accompanying drawings:—Figure 1 is a perspective view, and Fig. 2 is a longitudinal vertical sectional view.

A, represents the stacker-hood, and 1 is the tubular extension for connecting the head to the stacker pipe (not shown). The hood consists of sides 2, top 3, and bottom 4, which are all connected together. The sides 2 are preferably of the same length, but the bottom 4 extends only a short distance, and its outer edge extends beyond the first few openings 5 which are formed in the top 3. The openings 5 which are formed in the top 3 increase in number toward the outer end of the top. Connected to the sides 2 are preferably V-shaped standards or uprights 6, and journaled between the uprights is a shaft 7 to which is connected a plurality of fingers 8 made of any suitable material. These fingers preferably are curved and extend between the outer ends of the sides 2. An arm 9 is connected to the shaft 7, to which arm a rope 10 may be connected for oscillating the fingers for holding them at different angles, or at different elevations, to cause the hay or straw to be thrown or discharged in the direction permitted by the fingers at the elevation at which they are held. Arms 11 are connected to the opposite ends of the shaft 7, and connected to the arms 11 and the uprights 6 are coil-springs 12 for holding the fingers under spring tension and retaining them in a downward direction, or so that they are always caused to be drawn down between the sides 2, and the spring tends to overcome any resistance or pressure exerted against the fingers by the outcoming straw. So when the fingers are held at any elevation, the spring will exert a downward action upon the fingers so that they will tend to resist the outward movement of the straw and cause it to take a downward direction.

It is to be noted that the top or upper surface 3 of the hood does not extend the full length of the sides 2. This permits the fingers 8 always being retained between the sides so that the fingers can be brought into a position for acting upon the straw as it is discharged from the hood to cause it to take the direction desired according to the elevation at which the fingers are held. The bottom 4, as previously stated, extends slightly beyond the first few rows of openings, and this prevents the air from being discharged from the hood prior to the discharge of the straw into the hood, and thereby preventing the possibility of choking, but as the straw which will come through the hood in a packed mass is forced toward the further end of the hood, the air will be allowed to discharge more rapidly through the upper surface of the hood through the openings which increase in number toward the farther end of the hood. In this manner, air is allowed to escape from the hood, and the straw will drop by or practically by its own weight, so that there is no possibility of the air blast blowing the straw about after it leaves the hood, thus obviating the difficulty encountered with most stacker hoods in blowing off the top of the stack and preventing the formation of the stack. In case the straw should become choked in the hood, the fingers 8 could be raised to a higher elevation, and this would overcome any choking in the stacker hood and would allow the straw to fall therefrom. If it is desired to discharge the straw directly into a building, the fingers 8 would be thrown to an elevation where they would be out of the path of the forward end of the stacker so that the straw could be discharged directly through the forward end.

Having fully described my invention, what I claim as new and desire to secure by Letters Patent, is:—

1. A pneumatic stacker-hood having a shaft pivoted thereto which carries a plurality of fingers extending between the outer ends of the sides of the hood, said shaft having arms projecting laterally therefrom, springs extending from certain of said arms to the hood, and means extending from one of the arms for controlling the fingers.

2. A pneumatic stacker hood comprising sides, top and bottom connected together, the top having openings therein which increase in number toward the outer end of the top, and the bottom being relatively short, its outer edge extending beyond the first few openings in the top, standards connected with the sides, a shaft mounted to turn in said standards and carrying arms, means connected with these arms for locking the shaft axially in opposite directions, and a plurality of curved fingers carried by the shaft.

In testimony whereof I affix my signature, in the presence of two witnesses.

RENNIE DEAN FINNIGAN.

Witnesses:
 CLIFFORD L. NILES,
 C. C. GARRETSON.

Copies of this patent may be obtained for five cents each, by addressing the "Commissioner of Patents, Washington, D. C."